Feb. 6, 1945. W. H. BARLOW 2,368,799
COMPOSITE METAL COUPLING MEMBER
Filed Sept. 24, 1941

INVENTOR
William H. Barlow
BY
Fraser, Myers & Manley
ATTORNEY

Patented Feb. 6, 1945

2,368,799

UNITED STATES PATENT OFFICE 2,368,799

COMPOSITE METAL COUPLING MEMBER

William H. Barlow, Waterbury, Conn., assignor to Scoville Manufacturing Company, Waterbury, Conn., a corporation of Connecticut Application September 24, 1941, Serial No. 412,064

4 Claims. (Cl. 24—221)

My present invention relates to couplings of the turn-button or bayonet type, certain forms of such coupling being disclosed in Patent No. 2,239,125, dated April 22, 1941.

Couplings of this type are susceptible of general application and have found considerable use for detachably fastening aircraft cowling and inspection plates which must be made readily removable. Where used in securing aircraft cowling the coupling members should be as lightweight as possible and hence they have been made of aluminum or of an aluminum or magnesium base alloy. When made of such metals, however, which, because of the relative softness thereof and the considerable vibration to which they are subjected in use, the wear thereon is great and the useful life thereof is materially lessened.

The present invention accordingly has for its primary object to provide a coupling of the general type set forth wherein the essential property of lightness will be preserved and the objectionable property of short life will be overcome. I accomplish this by making the coupling members basically of lightweight metal and making the parts thereof which are subjected to wear, of a hard wear-resisting metal. Where a coupling member is made to consist in part of lightweight metal and in part of a hard wear-resisting metal, I propose to make such member of composite metal by so forming and uniting against separation the wear-resisting metal to the lightweight metal backing portion and thereby produce in a simple and economical manner a coupling member having the desirable properties set forth.

The invention will be better understood from the detailed description which follows, when considered in connection with the accompanying drawing showing a preferred embodiment and wherein—

Figure 1:
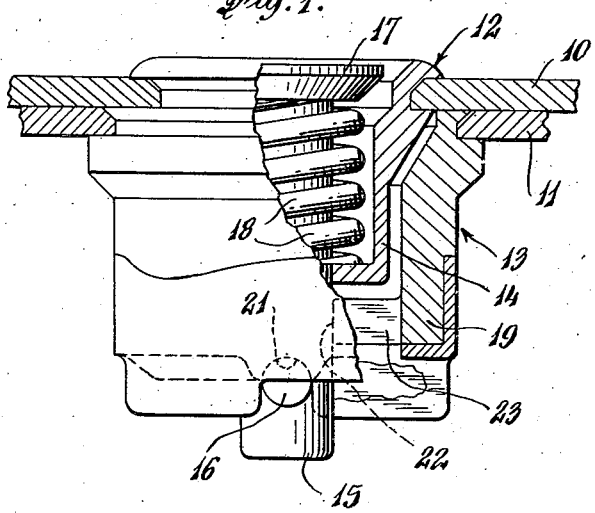
Figure 1 shows in elevation, with parts broken away, a coupling member of a type to which the present invention is applicable.
Figure 2:
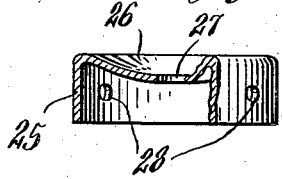
Fig. 2 is a view partly in elevation and partly in section of one of the parts used in making a coupling according to the present invention.
Figure 3:
Fig. 3 shows a side elevation of a cylindrical slug or blank used in making a coupling member according to the present invention.

Referring to the drawing, the reference characters 10 and 11 indicate a pair of plates each having an opening within which is fixedly mounted in any desired manner a coupling member 12 and 13, respectively, through the medium of which the plates 10 and 11 may be rapidly detachably connected together. In this connection it may be mentioned that the plate 10 may be a cowling for an airplane engine or the like, and the plate 11 a support or framework within which such engine or the like is mounted.

The coupling members 12 and 13 constitute a turn-button or bayonet type of coupling and may be of any desired detailed construction. Such coupling members, however, usually consist of a male member and a female member having cooperating locking means and spring-tensioning means for holding the parts in assembled relation. As herein shown, the member 12 is the male coupling member and consists generally of a cylindrical housing 14, the inner end of which has a central opening through which extends a stud 15, the end thereof which extends through the housing 14 being provided with a cross-pin 16 rigidly affixed thereto. The opposite end of the stud is formed with an enlarged head 17 provided with means (not shown) for engagement by a tool whereby the stud may be turned about its axis. Between the enlarged head 17 and the inner end of the cylindrical housing 14 is coil-spring 18 surrounding the stud 15 and normally urging the head 17 thereof outwardly with respect to the housing. The member 13 which is the female coupling member likewise consists of a substantially cylindrical housing or socket member 19 formed adjacent its inner end with opposed cam tracks 20 which terminate adjacent the highest points of the cams in detents 21. Said socket member 19 also has at its inner end a central opening 22 and a diametrical slot 23 disposed at an angle to the line joining the detents 21 and adapted to permit the insertion through the socket member of the stud 15 with its cross-pin 16.

A coupling of the general type hereinabove described is old in the art, and the present invention is primarily directed to coupling members of said general form which shall be exceedingly light in weight while having its surfaces which are subjected to wear, formed of a hard wear-resisting metal. The present invention also contemplates the method of making such coupling member of composite metal in a simple, expeditious, economical and practical manner.

In a coupling as herein shown, it will be appreciated that the cam surfaces 20 and the surfaces of the detents 21 on the cylindrical housing or socket member 19 will be subjected to considerable wear and vibration in use and hence it is proposed to make that portion of the socket member 19 which contains the cam tracks and detents from a hard wear-resisting metal such as steel, while the remainder or backing portion of said socket member may be made of lightweight metal such as aluminum or an aluminum or magnesium base alloy.

Figure 4:
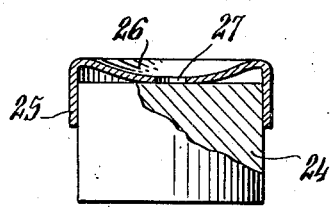
Fig. 4 is a view, partly in elevation and partly in section, of the first step in the assembly of the elements shown in Figs. 2 and 3 in the making of a coupling member according to the present invention.

To make the coupling member 13 of composite metal having the desirable properties of lightness in weight and wear-resistance at the surfaces subjected to wear, I start with a cylindrical blank or slug 24 of aluminum or an aluminum or magnesium base alloy and position over one end thereof, as shown in Fig. 4, a shallow cylindrical thin cup 25 of a hard wear-resisting metal such as steel. The base of said cup is dished inwardly, as shown at 26, and is formed with a central opening 27, and the side wall of said cup is formed with one or more openings 28, for purposes which will be presently explained.

Figure 5:
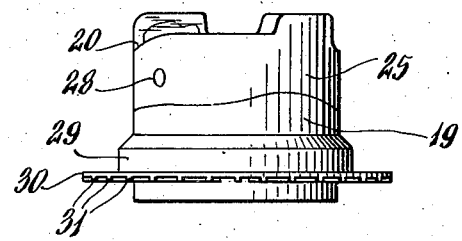
Fig. 5 shows in side elevation an intermediate stage of the coupling member in the course of its manufacture.
Figure 7:
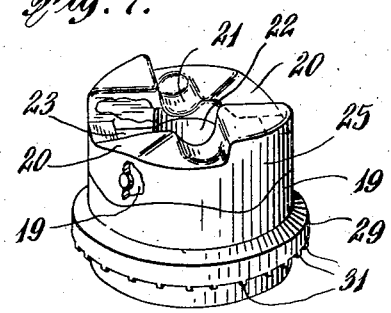
Fig. 7 shows a perspective view, with a portion broken away to better show a detail of a finished coupling member embodying the present invention.

The assembly as shown in Fig. 4 is then mounted in a suitable press provided with co-operating dies of desired configuration, and force is applied to the assembly in a direction longitudinally of the axis to simultaneously deform said parts into desired shape, with their complemental surfaces contiguous to each other to provide the socket member with the cam surfaces 20 and detents 21. In the course of this force pressing operation the socket member is formed with an enlargement 29 adjacent the base thereof and the excess metal is forced outwardly at said base to form an annular fin 30 the under surface of which is preferably ribbed or serrated, as indicated at 31. In the course of subjecting these parts to the force pressing operation the softer metal of the blank 24 which is made to constitute the backing portion of the coupling member is also caused to flow into and fill the openings 28 in the cup 25, as best shown in Fig. 7. This interengagement of the soft and hard metals serves to anchor the resulting backing portion of soft metal and the resulting crown portion of hard wear-resisting metal, against displacement. The blank of Fig. 5 is then subjected to a piercing or cutting operation which provides the coupling member with the central opening 22 and the diametrical slot 23 and cuts away the annular fin 30.

In the method of forming the coupling member 19 above described, the steel cup is subjected to severe strains, hence I have found it desirable to initially form the cup with a dished base 26 in order to provide enough metal stock in that portion thereof to withstand the severe forming operation, and I have provided the central opening 27 in the cup to allow the metal of the dished portion to be deformed or distorted radially and thereby avoid too severe a strain at the outer end of the dished portion.

Figure 6:
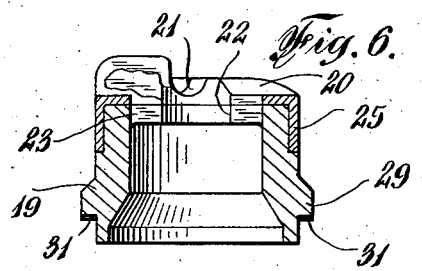
Fig. 6 shows a diametrical section of the coupling member of Fig. 5 after being further acted upon.

From an inspection of Figs. 1, 6, and 7 of the drawing it will be apparent that the cam tracks and detents of the socket member are formed in the crown portion of the member which is capped by the deformed steel cup and backed by the lightweight metal. Said cam surfaces and detents are thus able to withstand the wear and strain to which the coupling member is subjected in use. It will be further appreciated that this crown portion of steel is relatively thin and adds but little to the lightweight character of the backing portion which constitutes the major portion of the socket member.

From the foregoing detailed description it will therefore be recognized that I have provided a coupling member having the desirable properties of lightness in weight and resistance to wear due to friction and vibration, and is therefore especially adapted for use in aviation, and while I have shown and described a preferred embodiment of my invention it is to be understood that I do not wish to be limited to the details of construction disclosed since these are only given by way of example and may be varied within the range of mechanical and engineering skill without departing from the spirit of my invention as defined by the appended claims.

What I claim is:

1. A composite metal coupling member comprising a relatively lightweight metal backing portion and a thin crown portion of relatively hard wear-resisting metal, the crown portion being shaped with cam trackways and detents for cooperation with the locking pin of a cooperating coupling member, the backing portion contiguous to the crown portion being shaped complementally thereto, and said crown portion and said backing portion being anchored against relative displacement by interengaging parts on the side walls of said portions.

2. A socket coupling member of generally cylindrical configuration formed at one end with opposed cam trackways terminating adjacent their outer ends in detents, said socket member having a central opening therethrough and a diametrical slot disposed at an angle to the line joining the detents, characterized in that said socket member comprises a base portion of lightweight metal and has its end which is provided with the trackways and detents crowned with a relatively hard wear-resisting metal, and cooperating interengaging parts on the base portion and crown portion for anchoring said portions against separation.

3. A socket coupling member of generally cylindrical configuration formed at one end with opposed cam trackways terminating adjacent their outer ends in detents, said socket member having a central opening therethrough and a diametrical slot disposed at an angle to the line joining the detents, characterized in that said socket member comprises a base portion of lightweight metal and has its end which is provided with the trackways and detents crowned with a relatively hard wear-resisting metal, said crown having a lateral opening in its side wall and the base portion having a part extending into said lateral opening.

4. A socket coupling member of generally cylindrical configuration formed at one end with opposed cam trackways terminating adjacent their outer ends in detents, said socket member having a central opening therethrough and a diametrical slot disposed at an angle to the line joining the detents, characterized in that said socket member comprises a base portion of lightweight metal and has its end which is provided with the trackways and detents crowned with a relatively hard wear-resisting metal, said crown having a side wall which extends down over at least a part of the base portion and lies flush with the outer wall thereof.

WILLIAM H. BARLOW.

CERTIFICATE OF CORRECTION.

Patent No. 2,368,799. February 6, 1945.

WILLIAM H. BARLOW.

It is hereby certified that the name of the assignee in the above numbered patent was erroneously described and specified as "Scoville Manufacturing Company" whereas said name should have been described and specified as --Scovill Manufacturing Company, of Waterbury, Connecticut, a corporation of Connecticut--, as shown by the record of assignments in this office; and that the said Letters Patent should be read with this correction therein that the same may conform to the record of the case in the Patent Office.

Signed and sealed this 15th day of May, A. D. 1945.

Leslie Frazer (Seal) Acting Commissioner of Patents.